Figure 1:
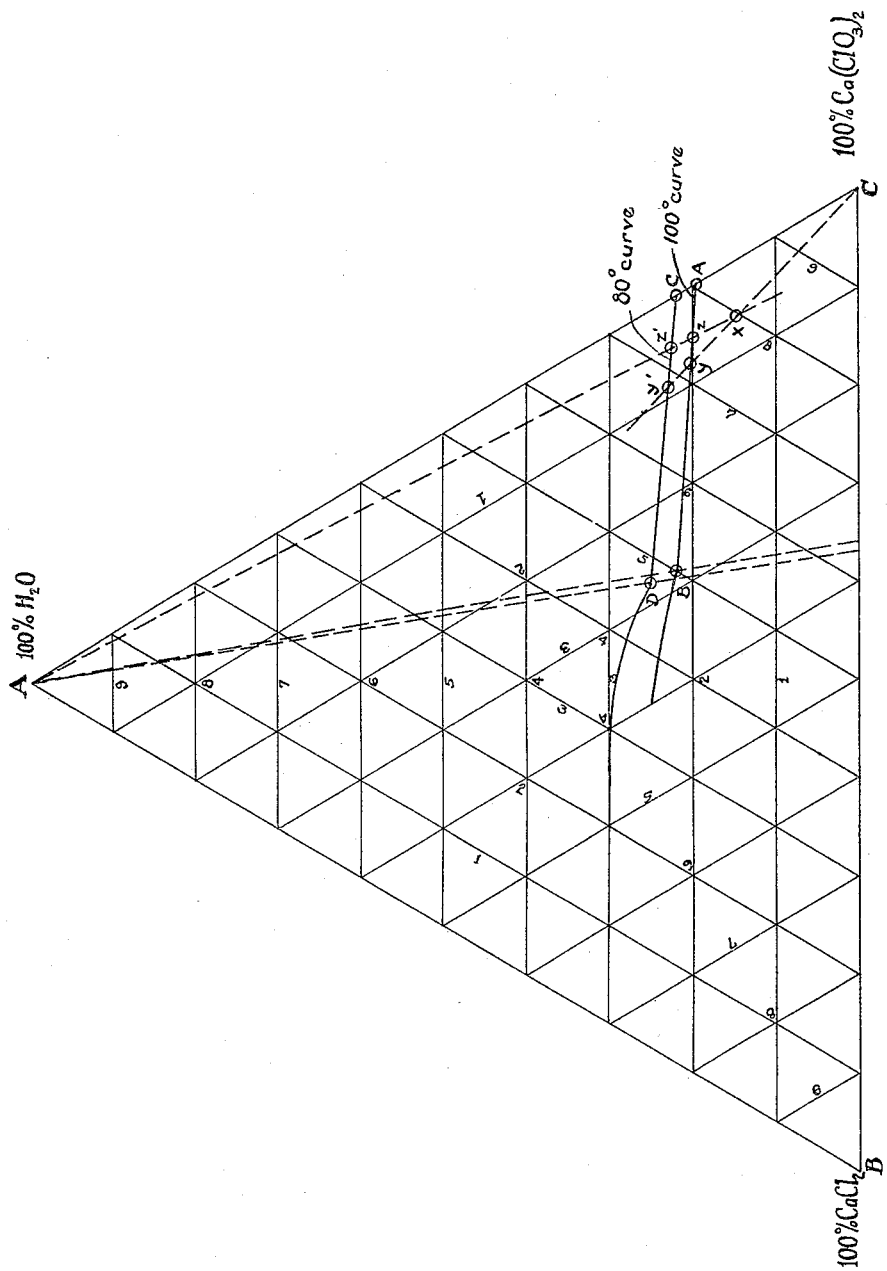

Jan. 10, 1933. S. B. HEATH 1,893,740
PURIFICATION OF CALCIUM CHLORATE

Filed March 6, 1930

INVENTOR
BY Sheldon B. Heath
Thomas Griswold, jr.
ATTORNEY

Patented Jan. 10, 1933

1,893,740

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

PURIFICATION OF CALCIUM CHLORATE

Application filed March 6, 1930. Serial No. 433,768.

The present invention relates to methods for purifying crude calcium chlorate crystals contaminated with calcium chloride by recrystallization from water.

In a co-pending application Serial No. 424,493, filed January 30, 1930, I have disclosed a process for making calcium chlorate which involves crystallizing the same as the dihydrated salt, $Ca(ClO_3)_2.2H_2O$, from an aqueous solution thereof containing calcium chloride in which the ratio of such chloride to such chlorate on the anhydrous basis is greater than $\frac{1}{1}$. The chlorate crystals so produced, when filtered from the mother liquor, form a moist, granular mass which cannot be dried directly by ordinary means without causing fusion of the crystals. The crude crystals contain normally about 4 to 6 per cent. calcium chloride as an impurity. A method for purifying the aforesaid crude crystals is highly desirable, and it is among the objects of this invention to prepare a purified calcium chlorate product in a substantially dry, granular form. This and other objects of the invention are accomplished by means of the improved method hereinafter fully described and pointed out in the claims, the annexed drawing and following description setting forth but a few of the various ways in which the principle of the invention may be used.

In said annexed drawing:—

The single figure is a chart showing the solubility curves of aqueous solutions of calcium chloride and calcium chlorate at 80° and 100° C., respectively, within the range of saturation with respect to the anhydrous chlorate.

The crude calcium chlorate dihydrate crystals, which are the immediate product of the process disclosed in the aforesaid pending application, may be purified by melting or by dissolving in a limited amount of hot water and recrystallizing therefrom. If the recrystallization is carried out at a temperature above about 60° to 67° C., which is the transition point range for $Ca(ClO_3)_2.2H_2O$ to anhydrous $Ca(ClO_3)_2$ in the presence of a liquid phase containing calcium chloride, the anhydrous form of crystals will be obtained. The latter crystals, upon separating from the mother liquor and cooling to room temperature, will completely absorb the traces of mother liquor adhering to the crystal surfaces by rehydration so that the cooled crystals, even if containing a slight amount of water of crystallization, are sensibly dry and have a composition closely approaching that of the anhydrous salt. However, if recrystallization is effected below 60° to 67° C., depending upon the amount of calcium chloride in the mother liquor, the crystals of the dihydrated salt will be obtained, which after separating from the mother liquor persistently retain traces of moisture upon the crystal surfaces and cannot be completely dried without fusion. In order to prepare a sensibly dry, granular product most suitable for handling and packaging the recrystallization of the crude material is to be conducted so as to yield crystals of the anhydrous salt.

In the drawing, the solubility curves of calcium chlorate in solutions containing relatively small amounts of calcium chloride at 80° and 100° C. are reproduced for purposes of illustration. Taking the 100° C. curve, for example, the point A represents the composition of a saturated aqueous solution of calcium chlorate at that temperature. With the addition of increasing amounts of calcium chloride the composition of the saturated solution changes continuously as shown by the curve AB until the point B is reached whereat the solution becomes saturated also with respect to calcium chloride as $$CaCl_2.2H_2O.$$

At the latter point the ratio of calcium chloride to calcium chlorate is approximately 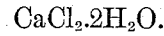 $\frac{28}{50}$ by weight, or very nearly in a molecular ratio of $\frac{1}{1}$.

Consequently a saturated solution having a composition represented by any point along the curve AB may be concentrated further with precipitation of $Ca(ClO_3)_2$ crystals while the composition of the mother liquor moves to the left along the curve until the equilibrium composition represented by point B is reached. Thereafter crystals of $Ca(ClO_3)_2$ and $CaCl_2.2H_2O$ will be precipitated together if the concentration is continued, so that the composition of the residual solution remains at that represented by B, and no further separation of chlorate crystals alone is possible. Similarly, the curve CD shows the solubility relationships prevailing at 80° C., D representing the equilibrium point for that temperature. For temperatures below 80° C. the corresponding curves lie above curve CD, and for temperatures above 100° C. they lie below curve AB on the chart.

A typical analysis for the crude calcium chlorate dihydrate crystals is as follows:—

| | Per cent |
|---|---|
| $Ca(ClO_3)_2$ | 79.1 |
| $CaCl_2$ | 5.8 |
| $H_2O$ | 15.1 |

The composition of these crude crystals is represented by point X on the chart. If such crystals are completely melted and slowly cooled to 100° C. so as to establish equilibrium conditions, a portion of the chlorate will be crystallized out in the anhydrous form and the residual mother liquor will have a composition represented by the point Y, which is determined by extending a straight line through X from the 100 per cent. $Ca(ClO_3)_2$ vertex to intersect the curve AB. By evaporating the mother liquor at 100° C. a further precipitation of anhydrous $Ca(ClO_3)_2$ crystals may be effected while the composition of the residual mother liquor follows along curve AB to the left. When the mother liquor composition reaches the point B no further separation of pure chlorate crystals will take place with continued evaporation. Hence the final mother liquor of composition approximating that of point B, after draining from the chlorate crystals, is advantageously to be returned to the original process for further working up as described in my aforementioned co-pending application.

Instead of simply melting the crystals as just described, they may be dissolved in sufficient water to form a clear solution at about 100° C., and the solution concentrated by evaporation under reduced pressure and salting out of anhydrous $Ca(ClO_3)_2$ crystals, as before. The composition of such solution will correspond to a point along a straight line drawn from the $H_2O$ vertex through point X, depending upon the proportion of water in the solution. If the exact amount of water required to effect complete solution is employed, the composition of the resulting saturated solution is represented by the point Z on the chart where the line from the $H_2O$ vertex through point X intersects curve AB.

Likewise, if the foregoing operations are to be conducted at 80° C., the corresponding points Y' and Z' on the curve CD are found at the intersection thereof with the lines drawn through point X from the $Ca(ClO_3)_2$ and $H_2O$ vertices, respectively. In precisely a similar manner, the corresponding points for any other temperature above 60° C. may be found by inserting the appropriate solubility curve and proceeding as just described. The temperatures of 100° and 80° C., for which the curves are reproduced in the chart, are not to be understood as imposing any limitation upon the purification method herein disclosed, which is intended to include operation at any desired temperature between about 60° C. and the atmospheric boiling point of the aqueous calcium chlorate solution from which purified anhydrous calcium chlorate crystals are to be precipitated. From practical considerations a temperature of about 100° C. is convenient, in that evaporation may be carried out at such temperature under moderately reduced pressures readily attainable with usual commercial apparatus. The crystallizing may be advantageously carried out in a "salting out" type of evaporator. The anhydrous $Ca(ClO_3)_2$ crystals discharged hot from the evaporator may be centrifuged to separate adhering mother liquor and, if desired, washed with a small amount of hot wash water. The crystals upon cooling will absorb any traces of moisture remaining on the surface by rehydration, so that they will be obtained in a sensibly dry, free flowing granular form.

The foregoing improved method or process may be employed for separating purified anhydrous calcium chlorate crystals from any mixture of calcium chloride and calcium chlorate wherein the molecular ratio of the former to the latter is less than about $\frac{1}{1}$, the final mother liquor left after removal of the crystals consisting of a saturated solution containing about molecular proportions of calcium chloride and calcium chlorate.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of separating calcium chlorate from a solution thereof containing calcium chloride which comprises crystallizing the former at a temperature above 60° C. as anhydrous $Ca(ClO_3)_2$ from such solution which is saturated with respect thereto but unsaturated with respect to calcium chloride dihydrate.

2. The method of separating calcium chlorate from a solution thereof containing calcium chloride which comprises crystallizing the former at a temperature above 60° C. as anhydrous $Ca(ClO_3)_2$ from such solution wherein the molecular ratio of chloride to chlorate is less than $\frac{1}{1}$.

3. The method of separating calcium chlorate from a solution thereof containing calcium chloride wherein the molecular ratio of chloride to chlorate is less than $\frac{1}{1}$ which comprises concentrating such solution to saturation with respect to such chlorate and crystallizing the latter therefrom at a temperature above 60° C.

4. The method of purifying calcium chlorate from an accompanying impurity of calcium chloride which comprises dissolving such impure compound in water to form a solution saturated with respect to anhydrous $Ca(ClO_3)_2$ but unsaturated with respect to $CaCl_2.2H_2O$, and crystallizing anhydrous $Ca(ClO_3)_2$ therefrom at a temperature above 60° C.

5. The method of purifying calcium chlorate from an accompanying impurity of calcium chloride which comprises dissolving such impure compound in water to form a solution wherein the ratio of chloride to chlorate is less than $\frac{1}{1}$, concentrating to saturation with respect to anhydrous $Ca(ClO_3)_2$ at a temperature above 60° C., crystallizing such anhydrous $Ca(ClO_3)_2$ therefrom and separating the crystals from the mother liquor.

6. The method of purifying calcium chlorate from an accompanying impurity of calcium chloride which comprises preparing a solution of such impure compound saturated with respect to anhydrous $Ca(ClO_3)_2$ at a temperature above 60° C., crystallizing such anhydrous $Ca(ClO_3)_2$ therefrom and separating the crystals from the mother liquor.

Signed by me this 26th day of February, 1930.

SHELDON B. HEATH.